United States Patent
Ding et al.

(10) Patent No.: US 11,270,212 B2
(45) Date of Patent: Mar. 8, 2022

(54) KNOWLEDGE GRAPH PROCESSING METHOD AND DEVICE

(71) Applicants: Lei Ding, Beijing (CN); Yixuan Tong, Beijing (CN); Bin Dong, Beijing (CN); Shanshan Jiang, Beijing (CN); Yongwei Zhang, Beijing (CN)

(72) Inventors: Lei Ding, Beijing (CN); Yixuan Tong, Beijing (CN); Bin Dong, Beijing (CN); Shanshan Jiang, Beijing (CN); Yongwei Zhang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 929 days.

(21) Appl. No.: 15/919,355

(22) Filed: Mar. 13, 2018

(65) Prior Publication Data

US 2018/0341863 A1 Nov. 29, 2018

(30) Foreign Application Priority Data

May 27, 2017 (CN) .......................... 201710392166.6

(51) Int. Cl.
*G06N 5/02* (2006.01)
*G06N 3/04* (2006.01)
(Continued)

(52) U.S. Cl.
CPC ........... *G06N 5/02* (2013.01); *G06F 16/2237* (2019.01); *G06F 16/288* (2019.01);
(Continued)

(58) Field of Classification Search
CPC .............................. G06N 5/02; G06F 16/2237
See application file for complete search history.

(56) References Cited

U.S. PATENT DOCUMENTS

2017/0337182 A1 11/2017 Jiang et al.
2017/0372169 A1* 12/2017 Li ........................ G06K 9/6223
(Continued)

FOREIGN PATENT DOCUMENTS

CN 105630901 6/2016
CN 106355627 1/2017

OTHER PUBLICATIONS

Xu, Jiacheng, et al. "Knowledge graph representation with jointly structural and textual encoding." arXiv preprint arXiv: 1611.08661 (2016). (Year: 2016).*

(Continued)

*Primary Examiner* — Kevin W Figueroa
(74) *Attorney, Agent, or Firm* — IPUSA, PLLC

(57) ABSTRACT

Knowledge graph processing method and device are disclosed. The method includes steps of obtaining an entity set containing a first entity, a second entity, and relation information; acquiring text information and image information related to the first entity and the second entity; generating a first structural information vector of the first entity and a second structural information vector of the second entity, and creating a first text information vector of the first entity, a first image information vector of the first entity, a second text information vector of the second entity, and a second image information vector of the second entity; and building a joint loss function so as to attain a first target vector of the first entity, a second target vector of the second entity, and a target relation vector of the relation information between the first entity and the second entity.

5 Claims, 11 Drawing Sheets

(51) Int. Cl.
  *G06N 3/08* (2006.01)
  *G06F 16/28* (2019.01)
  *G06F 16/31* (2019.01)
  *G06F 16/951* (2019.01)
  *G06F 16/22* (2019.01)
  *G06F 16/901* (2019.01)
  *G06F 40/279* (2020.01)
  *G06F 40/295* (2020.01)

(52) U.S. Cl.
  CPC ........ *G06F 16/313* (2019.01); *G06F 16/9024* (2019.01); *G06F 16/951* (2019.01); *G06F 40/279* (2020.01); *G06F 40/295* (2020.01); *G06N 3/0454* (2013.01); *G06N 3/084* (2013.01); *G06N 5/022* (2013.01)

(56) References Cited

U.S. PATENT DOCUMENTS

2018/0144252 A1\* 5/2018 Minervini ............. G06F 40/247
2018/0332347 A1\* 11/2018 Hamiti ................. H04N 21/435

OTHER PUBLICATIONS

Du, Bo, et al. "Stacked convolutional denoising auto-encoders for feature representation." IEEE transactions on cybernetics 47.4 (2016): 1017-1027. (Year: 2016).\*

"Knowledge Graph" Wikipedia, the free encyclopedia, last edited on Feb. 16, 2018, <URL> https://en.wikipedia.org/wiki/Knowledge_Graph.

Chinese Office Action for CN201710392166.6 dated Apr. 6, 2021 with English Translation.

\* cited by examiner

FIG.13
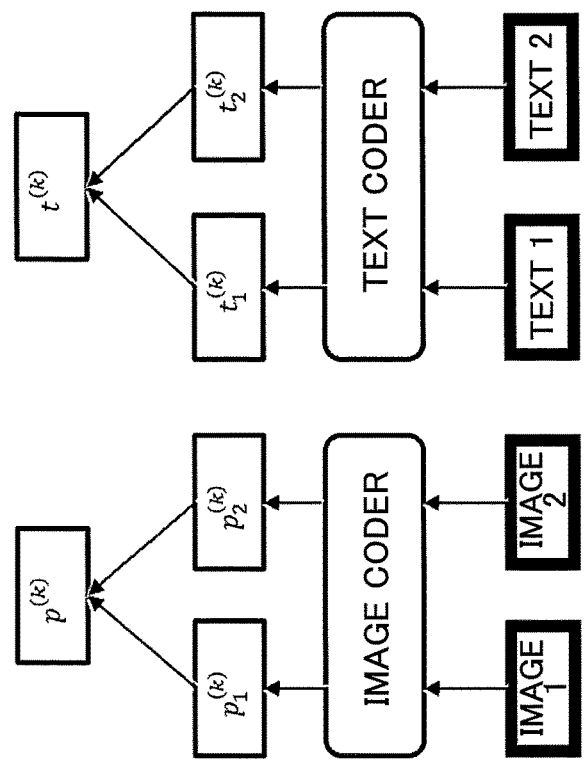
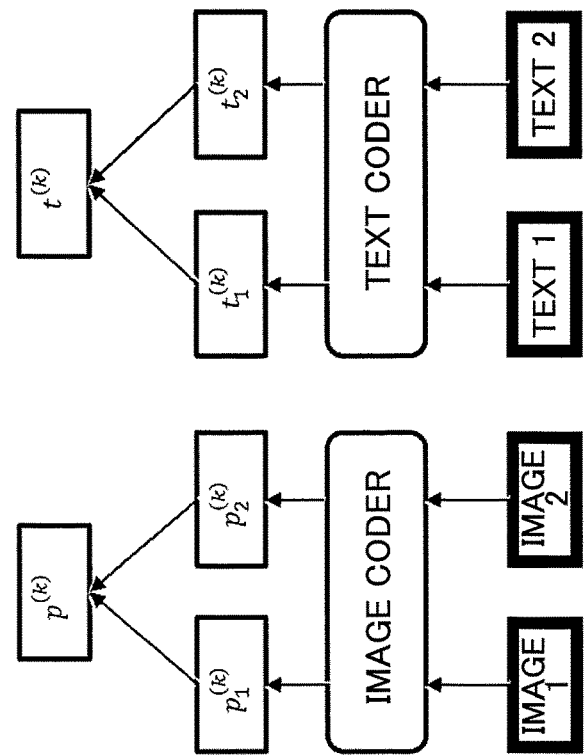
HEAD ENTITY + RELATION = TAIL ENTITY

KNOWLEDGE GRAPH PROCESSING METHOD AND DEVICE

BACKGROUND OF THE DISCLOSURE

1. Field of the Disclosure

The present disclosure relates to the field of natural language processing and knowledge graphs, and more particularly relates to a method and device for processing a knowledge graph as well as a non-transitory computer-readable medium.

2. Description of the Related Art

With the rapid development of modern society, people's lives have entered the era of information explosion. A large number of new entities and pieces of information appear every day. Nowadays, the Internet is the most convenient platform for acquiring information, and the demand of screening and induction of valid information is becoming more and more urgent. How to obtain valuable information from a huge amount of data has become a difficult problem. Knowledge graphs emerge as the times require.

In general, a knowledge graph represents proper names such as people's names, place names, book titles, team names and the like and things as entities, and the internal links between the entities as relations, so as to express a great amount of knowledge in a database as triples. Each of the triples may be denoted as (h, r, t) in which h is a head entity, r is a relation, and t is a tail entity. For example, regarding a piece of knowledge that Beijing is the capital of the People's Republic of China (PRC), it may be described as a triple, i.e., (Beijing, Capital-Of, PRC) in a knowledge graph.

Here it should be noted that for more information about the knowledge graph, it is also possible to see en.wikipedia.org/wiki/Knowledge_Graph, for instance.

As the study on the knowledge graph goes on, the knowledge graph may well assist in natural language processing and semantic analysis. However, with the accumulation of knowledge and the increase of the amount of data of the knowledge graph, the structure of the knowledge graph is becoming more and more complicated. On the other hand, remarkable progress has been made in the research about the knowledge graph in recent years. By mapping the entities and their relations in the knowledge graph into low-dimensional continuous vector spaces, it is possible to solve the problem of sparsity and low efficiency generated when carrying out the representation learning of knowledge graphs before.

However, recently there has been a problem in the vector representations of the entities and their relations in the knowledge graph, namely, conventional algorithms attain the vector representations of the entities and their relations from the known topological structure of the knowledge graph without utilizing other information of the entities so that the results acquired are not accurate and comprehensive.

SUMMARY OF THE DISCLOSURE

In light of the above, the present disclosure provides a method and device for processing a knowledge graph by which it is possible to give more accurate and comprehensive vector representations of the entities and relations in the knowledge graph.

According to a first aspect of the present disclosure, a knowledge graph processing method is provided which includes steps of obtaining an entity set from a knowledge graph waiting for processing, the entity set containing a first entity, a second entity, and relation information between the first entity and the second entity; acquiring text information and image information related to the first entity and the second entity from a database; generating a first structural information vector of the first entity and a second structural information vector of the second entity based on structural information of the knowledge graph, and creating a first text information vector of the first entity, a first image information vector of the first entity, a second text information vector of the second entity, and a second image information vector of the second entity based on the text information and the image information acquired; and building a joint loss function based on the first structural information vector, the first text information vector, the first image information vector, the second structural information vector, the second text information vector, and the second image information vector, and carrying out optimization with respect to the joint loss function so as to attain a first target vector of the first entity, a second target vector of the second entity, and a target relation vector of the relation information between the first entity and the second entity when the joint loss function is optimized.

According to a second aspect of the present disclosure, a knowledge graph processing device is provided which includes an entity set obtainment part configured to obtain an entity set from a knowledge graph waiting for processing, the entity set containing a first entity, a second entity, and relation information between the first entity and the second entity; an information acquirement part configured to acquire text information and image information related to the first entity and the second entity from a database; a vector generation part configured to generate a first structural information vector of the first entity and a second structural information vector of the second entity based on structural information of the knowledge graph, and create a first text information vector of the first entity, a first image information vector of the first entity, a second text information vector of the second entity, and a second image information vector of the second entity based on the text information and the image information acquired; and a processing part configured to build a joint loss function based on the first structural information vector, the first text information vector, the first image information vector, the second structural information vector, the second text information vector, and the second image information vector, and carry out optimization with respect to the joint loss function so as to attain a first target vector of the first entity, a second target vector of the second entity, and a target relation vector of the relation information between the first entity and the second entity when the joint loss function is optimized.

According to a third aspect of the present disclosure, a non-transitory computer-readable medium is provided which has computer-executable instructions for execution by a processing system, in which, the computer-executable instructions, when executed, cause the processing system to carry out the knowledge graph processing method described above.

Therefore, it is obvious that the vector representations of the entities and their relations in a knowledge graph may be calculated not only from the known topological structure of the knowledge graph. It is also possible to acquire the text information and the image information related to the entities from a database, and generate text information vectors and image information vectors on the basis of the text information and the image information pertaining to the entities, so as to create final vector representations of the entities and their relations on the grounds of the structural information vectors obtained by using the known structural information of the knowledge graph as well as the text information vectors and the image information vectors relating to the entities. In this way, by utilizing much more information concerning the entities in the knowledge graph to produce the vector representations of the entities and their relations, it is possible to provide more accurate and comprehensive vector representations of the entities and their relations.

BRIEF DESCRIPTION OF THE DRAWINGS

FIG. 13 illustrates an example of a complex knowledge graph.

DETAILED DESCRIPTION OF THE PREFERRED EMBODIMENTS

In order to let a person skilled in the art better understand the present disclosure, hereinafter, the embodiments of the present disclosure will be concretely described with reference to the drawings. However, it should be noted that the same symbols, which are in the specification and the drawings, stand for constructional elements having basically the same function and structure, and repeated explanations for the constructional elements are omitted.

In order to solve the problem in the conventional technologies that the vector representations of the entities and their relations in a knowledge graph are computed on the basis of the known topological structure of the knowledge graph without utilizing other information of the entities so that the results obtained are not accurate and comprehensive, the embodiments of the present disclosure aim to provide a method and device for processing the knowledge graph by which it is possible to acquire more accurate and comprehensive vector representations of the entities and their relations in the knowledge graph.

First Embodiment

A knowledge graph processing method is given in this embodiment.

Figure 1:
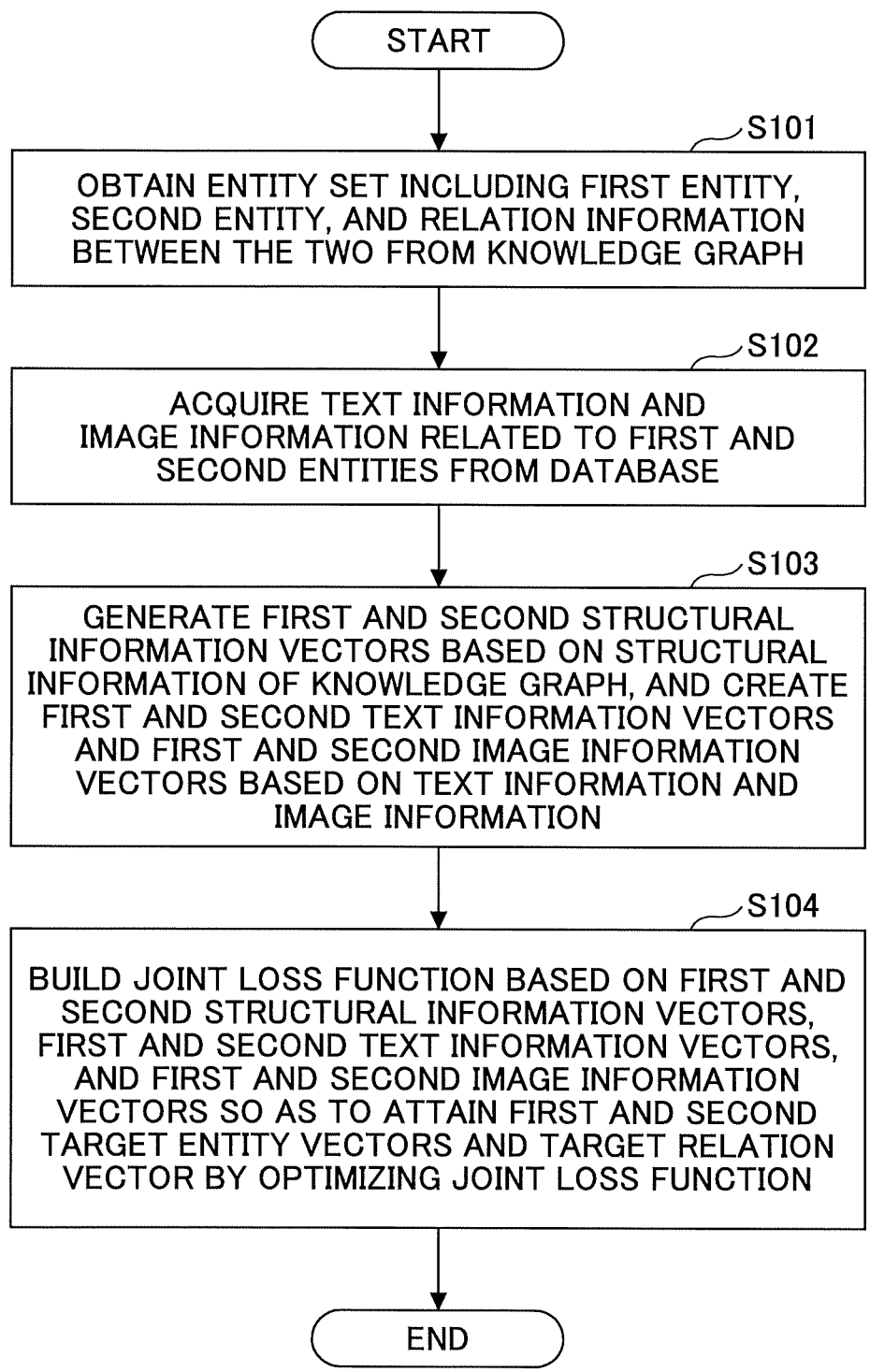
FIG. 1 is a flowchart of a knowledge graph processing method according to a first embodiment of the present disclosure.

FIG. 1 is a flowchart of the knowledge graph processing method according to this embodiment.

As presented in FIG. 1, in STEP S101, an entity set is obtained from a knowledge graph waiting for processing. The entity set is inclusive of a first entity, a second entity, and a relation (also called "relation information") between the first entity and the second entity.

In STEP S102, the text information and the image information related to the first entity and the second entity are acquired from a database.

In STEP S103, a first structural information vector of the first entity and a second structural information vector of the second entity are generated on the basis of the structural information of the knowledge graph, and a first text information vector of the first entity, a first image information vector of the first entity, a second text information vector of the second entity, and a second image information vector of the second entity are produced on the grounds of the text information and the image information acquired.

In STEP S104, a joint loss function is created on the basis of the first structural information vector, the first text information vector, the first image information vector, the second structural information vector, the second text information vector, and the second image information vector, and optimization is conducted in regard to the joint loss function so as to attain a first target vector (also called a "first target entity vector") of the first entity, a second target vector (also called a "second target entity vector") of the second entity, and a target relation vector of the relation information between the first entity and the second entity when the joint loss function is optimized.

In this embodiment, the vector representations of the entities and their relations in a knowledge graph may be calculated according to not only the known topological structure of the knowledge graph. It is also possible to acquire the text information and the image information related to the entities from a database, and generate text information vectors and image information vectors on the basis of the text information and the image information pertaining to the entities, so as to produce final vector representations of the entities and their relations on the grounds of the structural information vectors obtained by utilizing the known structural information of the knowledge graph as well as the text information vectors and the image information vectors relating to the entities. In this way, by taking advantage of much more information concerning the entities in the knowledge graph to create the vector representations of the entities and their relations, it is possible to provide more accurate and comprehensive vector representations of the entities and their relations.

Figure 2:
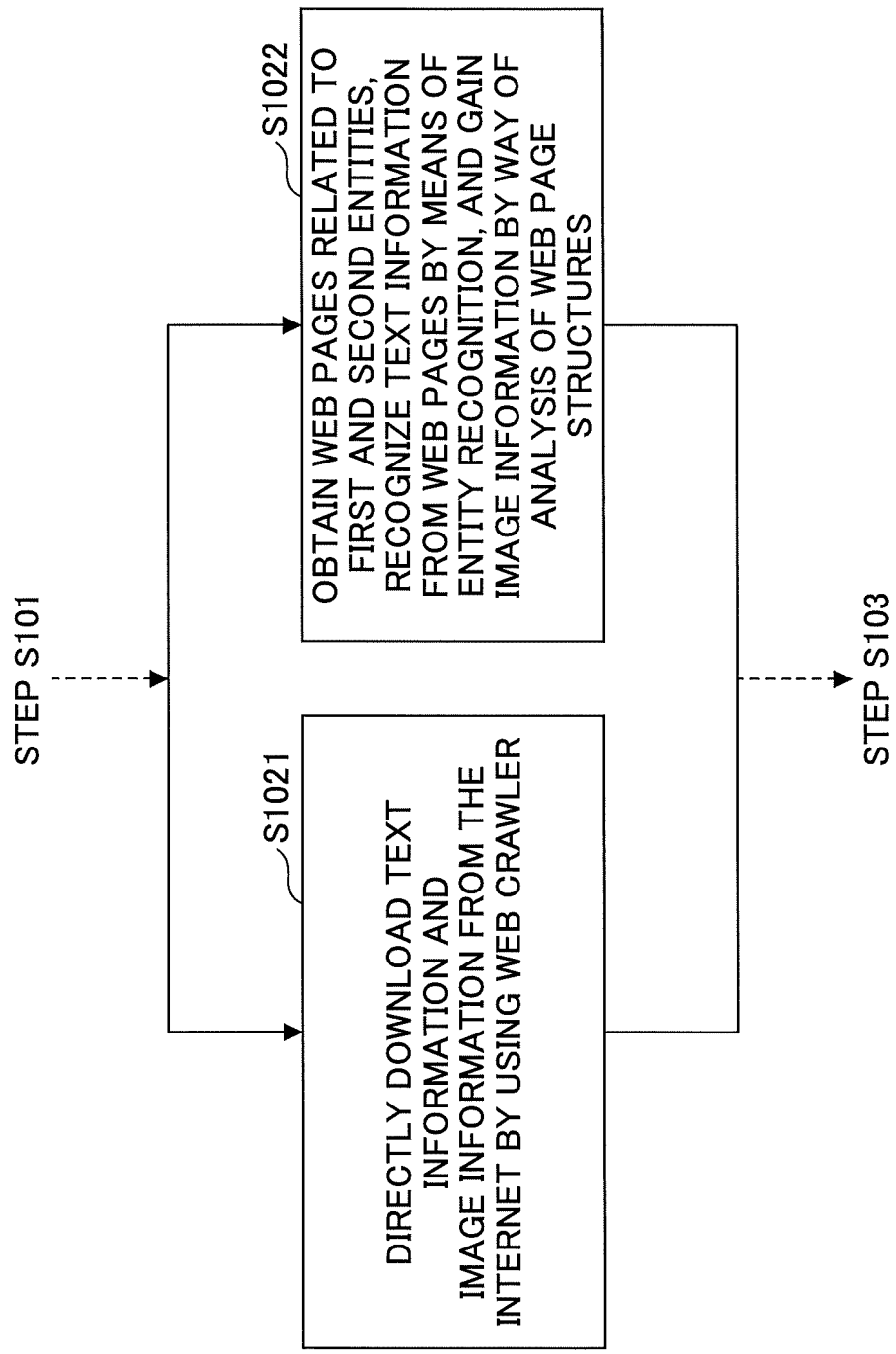
FIG. 2 illustrates a process of obtaining the text information and the image information related to the entities in a knowledge graph from a database.

As an example, STEP S102 in FIG. 1 may include a sub step S1021 and/or a sub step S1022, as shown in FIG. 2.

FIG. 2 illustrates a process of obtaining the text information and the image information related to the first entity and the second entity from a database (e.g., the Internet which may be regarded as a giant database).

In the sub step S1021, the text information and the image information related to the first entity and the second entity may be directly downloaded from the Internet by means of a web crawler.

In the sub step S1022, the web pages pertaining to the first entity and the second entity may be obtained from the Internet. The text information relating to the first entity and the second entity may be recognized from the texts in the web pages by carrying out entity recognition with respect to the web pages, and the image information related to the first entity and the second entity may be procured by analyzing the structures of the web pages.

Figure 3:
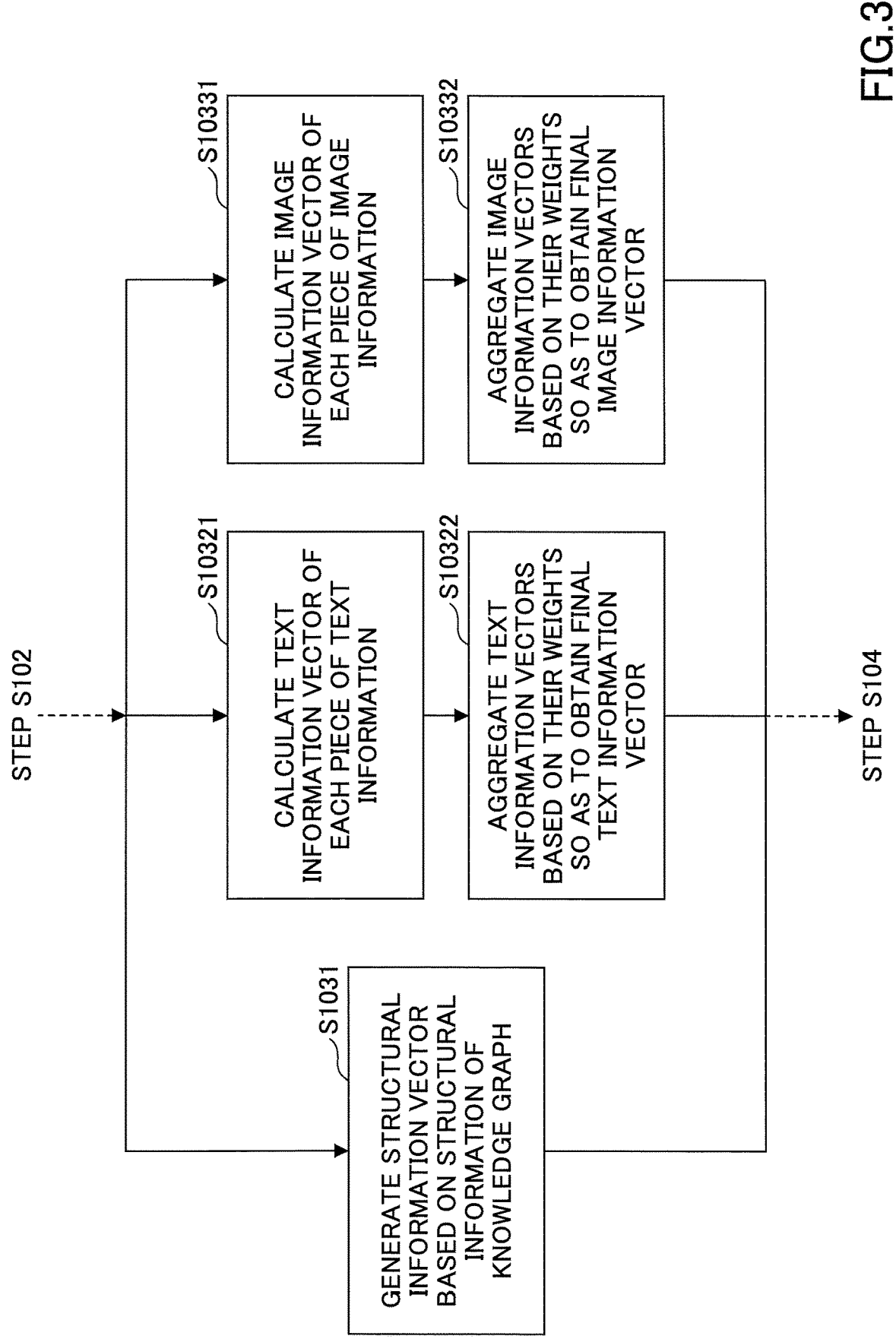
FIG. 3 illustrates a process of generating a structural information vector, a text information vector, and an image information vector of an entity.

As an illustration, STEP S103 in FIG. 1 may contain a sub step S1031, sub steps S10321 and S10322, and sub steps S10331 and S10332, as indicated in FIG. 3.

FIG. 3 illustrates a process of generating the structural information vector, the text information vector, and the image information vector of each of the first entity and the second entity.

In the sub step S1031, the structural information vector of the same entity is generated on the basis of the structural information of the knowledge graph.

In the sub step S10321, for each piece of text information related to the same entity, a text information vector of the corresponding piece of text information is computed.

In the sub step S10322, the text information vectors are aggregated on the grounds of their respective weights so as to acquire a final text information vector.

In the sub step S10331, for each piece of image information relating to the same entity, an image information vector of the corresponding piece of image information is calculated.

In the sub step S10332, the image information vectors are aggregated on the basis of their respective weights so as to attain a final image information vector.

In particular, generating the first text information vector of the first entity and the second text information vector of the second entity on the basis of the text information acquired may be inclusive of the following sub steps, namely, for each piece of text information related to the first entity, calculating a text information vector of the corresponding piece of text information; aggregating the text information vectors related to the first entity on the basis of their respective weights so as to obtain the first text information vector of the first entity; for each piece of text information relating to the second entity, computing a text information vector of the corresponding piece of text information; and aggregating the text information vectors relating to the second entity on the grounds of their respective weights so as to acquire the second text information vector of the second entity.

Also, creating the first image information vector of the first entity and the second image information vector of the second entity on the basis of the image information acquired may be inclusive of the following sub steps, namely, for each piece of image information related to the first entity, calculating an image information vector of the corresponding piece of image information; aggregating the image information vectors related to the first entity on the basis of their respective weights so as to obtain the first image information vector of the first entity; for each piece of image information relating to the second entity, computing an image information vector of the corresponding piece of image information; and aggregating the image information vectors relating to the second entity on the grounds of their respective weights so as to acquire the second image information vector of the second entity.

Furthermore, it is possible to utilize a de-noising auto-encoder to perform calculation on the text information acquired so as to obtain the text information vectors of the entities.

Also, the image information vectors of the entities may be gained by making use of a stacked convolutional de-noising auto-encoder to conduct calculation with respect to the image information acquired.

Figure 4:
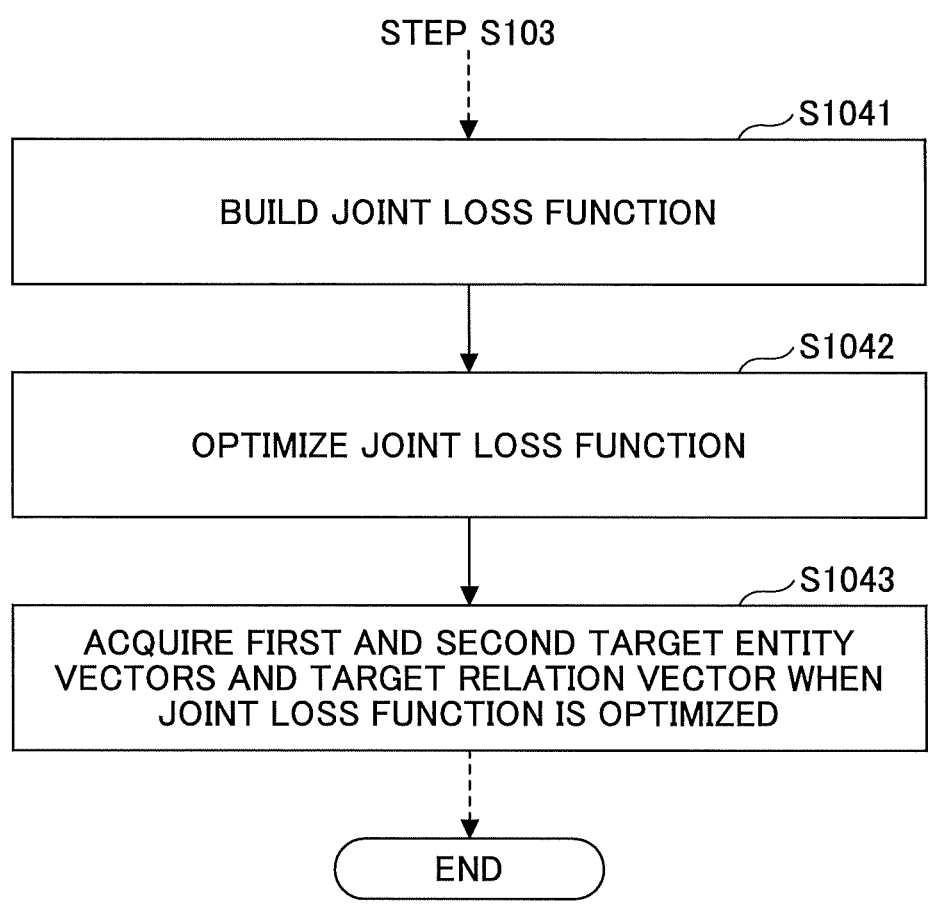
FIG. 4 illustrates a process of creating two target vectors of two entities and a target relation vector of the relation between the two entities.

As an example, STEP S104 in FIG. 1 may be inclusive of sub steps S1041 to S1043, as presented in FIG. 4.

FIG. 4 illustrates a process of generating the first target vector of the first entity, the second target vector of the second entity, and the target relation vector of the relation information between the first entity and the second entity.

In the sub step S1401, a joint loss function is built.

In the sub step S1042, optimization is conducted in regard to the joint loss function.

In the sub step S1043, the first target vector of the first entity, the second target vector of the second entity, and the target relation vector of the relation information between the first entity and the second entity are attained when the joint loss function is optimized.

Second Embodiment

In this embodiment, a knowledge graph processing device is provided.

Figure 5:
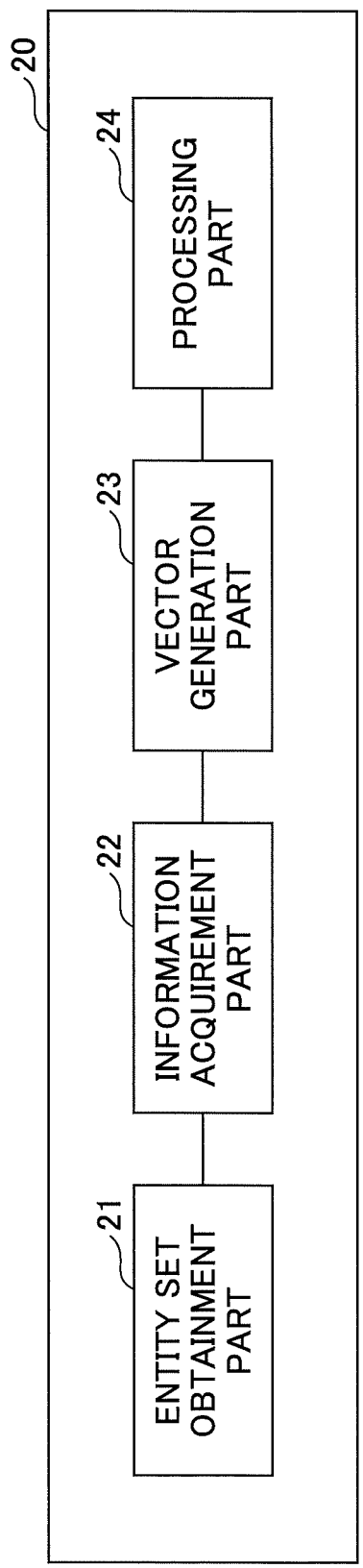
FIG. 5 is a block diagram of a knowledge graph processing device according to a second embodiment of the present disclosure.

FIG. 5 is a block diagram of a knowledge graph processing device 20 according to this embodiment, which may carry out the knowledge graph processing methods according to the embodiments of the present disclosure.

As shown in FIG. 5, the knowledge graph processing device 20 includes an entity set obtainment part 21, an information acquirement part 22, a vector generation part 23, and a processing part 24.

The entity set obtainment part 21 is configured to obtain an entity set from a knowledge graph waiting for processing, for example, conducting STEP S101 in FIG. 1. The entity set has a first entity, a second entity, and a relation (also called "relation information") between the first entity and the second entity.

The information acquirement part 22 is configured to acquire the text information and the image information relating to the first entity and the second entity from a database (e.g., the Internet), for instance, carrying out STEP S102 in FIG. 1.

The vector generation part 23 is configured to generate a first structural information vector of the first entity and a second structural information vector of the second entity on the basis of the structural information of the knowledge graph, and create a first text information vector of the first entity, a first image information vector of the first entity, a second text information vector of the second entity, and a second image information vector of the second entity on the grounds of the text information and the image information acquired, for example, executing STEP S103 in FIG. 1.

The processing part 24 is configured to build a joint loss function on the basis of the first structural information vector, the first text information vector, the first image information vector, the second structural information vector, the second text information vector, and the second image information vector, and carry out optimization with respect to the joint loss function so as to gain a first target vector of the first entity, a second target vector of the second entity, and a target relation vector of the relation information between the first entity and the second entity when the joint loss function is optimized, for instance, implementing STEP S104 in FIG. 1.

In this embodiment, the vector representations of the entities and their relations in a knowledge graph may be calculated based on not only the known topological structure of the knowledge graph. It is also possible to acquire the text information and the image information related to the entities from a database, and generate text information vectors and image information vectors on the grounds of the text information and the image information pertaining to the entities, so as to procure final vector representations of the entities and their relations on the basis of the structural information vectors obtained by employing the known structural information of the knowledge graph as well as the text information vectors and the image information vectors relating to the entities. In this way, by making use of much more information relating to the entities in the knowledge graph to create the vector representations of the entities and their relations, it is possible to give more accurate and comprehensive vector representations of the entities and their relations.

Figure 6:
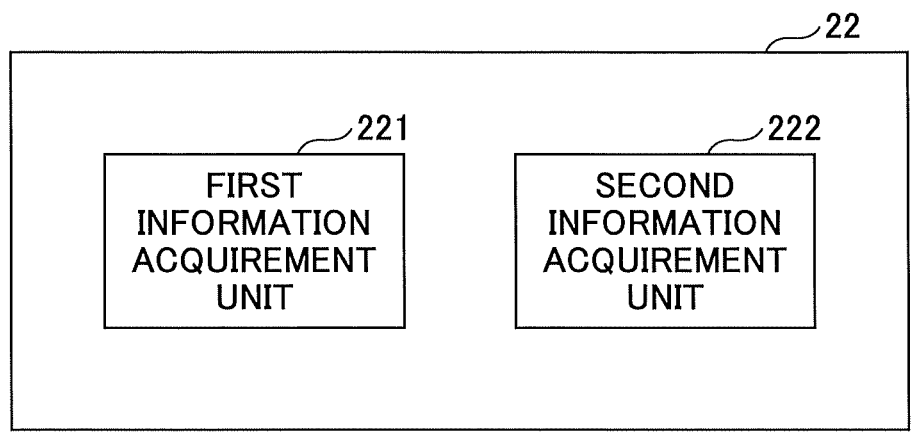
FIG. 6 is a block diagram of an information acquirement part.

As an example, the information acquirement part 22 in FIG. 5 may contain a first information acquirement unit 221 and/or a second information acquirement unit 222, as indicated in FIG. 6.

FIG. 6 is a block diagram of the information acquirement part 22.

The first information acquirement unit 221 is configured to directly download the text information and the image information related to the first entity and the second entity from the Internet by way of a web crawler, for example, carrying out the sub step S1021 in FIG. 2.

The second information acquirement unit 222 is configured to acquire the web pages relating to the first entity and the second entity from the Internet, and then, perform entity recognition on the web pages so as to recognize the text information relating to the first entity and the second entity from the texts in the web pages, and attain the image information pertaining to the first entity and the second entity by analyzing the structures of the web pages, for instance, conducting the sub step S1022 in FIG. 2.

Figure 7:
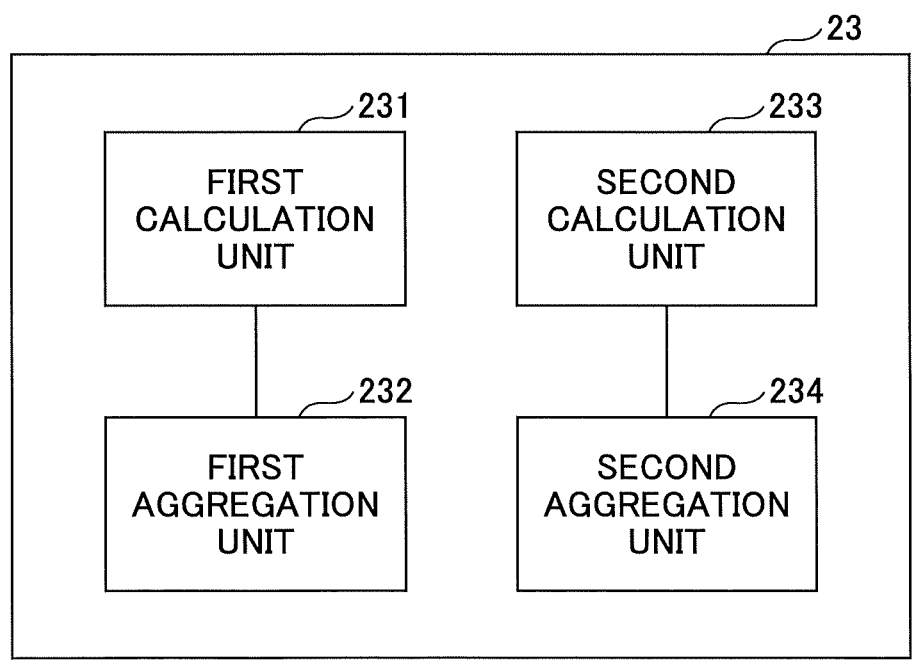
FIG. 7 is a block diagram of a vector generation part.

As an illustration, the vector generation part 23 in FIG. 5 may include a first calculation unit 231, a first aggregation unit 232, a second calculation unit 233, and a second aggregation unit 234, as shown in FIG. 7.

FIG. 7 is a block diagram of the vector generation part 23.

The first calculation unit 231 is configured to execute, for example, the sub step S10321 in FIG. 3, i.e., for each piece of text information related to the first entity, calculate a text information vector of the corresponding piece of text information.

The first aggregation unit 232 is configured to implement, for instance, the sub step S10322 in FIG. 3, i.e., aggregate the text information vectors relating to the first entity on the basis of their respective weights so as to acquire the first text information vector of the first entity.

The second calculation unit 233 is configured to execute, for example, the sub step S10321 in FIG. 3, i.e., for each piece of text information related to the second entity, calculate a text information vector of the corresponding piece of text information.

The second aggregation unit 234 is configured to implement, for instance, the sub step S10322 in FIG. 3, i.e., aggregate the text information vectors relating to the second entity on the basis of their respective weights so as to acquire the second text information vector of the second entity.

Figure 8:
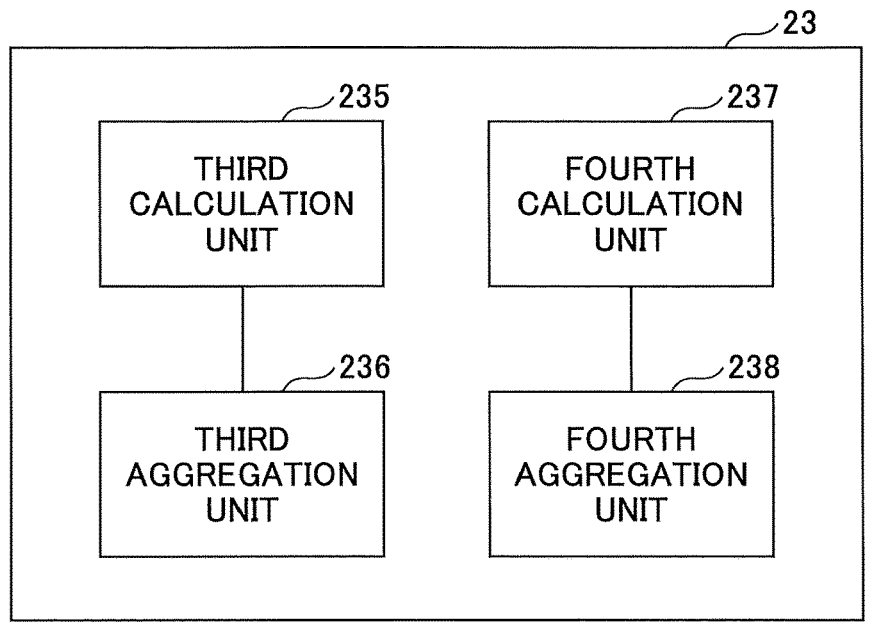
FIG. 8 is another block diagram of the vector generation part.

As an example, the vector generation part 23 in FIG. 5 may contain a third calculation unit 235, a third aggregation unit 236, a fourth calculation unit 237, and a fourth aggregation unit 238, as shown in FIG. 8.

FIG. 8 is another block diagram of the vector generation part 23.

The third calculation unit 235 is configured to conduct, for example, the sub step S10331 in FIG. 3, i.e., for each piece of image information relating to the first entity, an image information vector of the corresponding piece of image information is calculated.

The third aggregation unit 236 is configured to carry out, for instance, the sub step S10332 in FIG. 3, i.e., aggregate the image information vectors relating to the first entity on the grounds of their respective weights so as to attain the first image information vector of the first entity.

The fourth calculation unit 237 is configured to execute, for example, the sub step S10331 in FIG. 3, i.e., for each piece of image information relating to the second entity, an image information vector of the corresponding piece of image information is calculated.

The fourth aggregation unit 238 is configured to implement, for instance, the sub step S10332 in FIG. 3, i.e., aggregate the image information vectors relating to the second entity on the basis of their respective weights so as to attain the second image information vector of the second entity.

Third Embodiment

An electronic apparatus able to achieve knowledge graph processing is briefly introduced in this embodiment.

Figure 9:
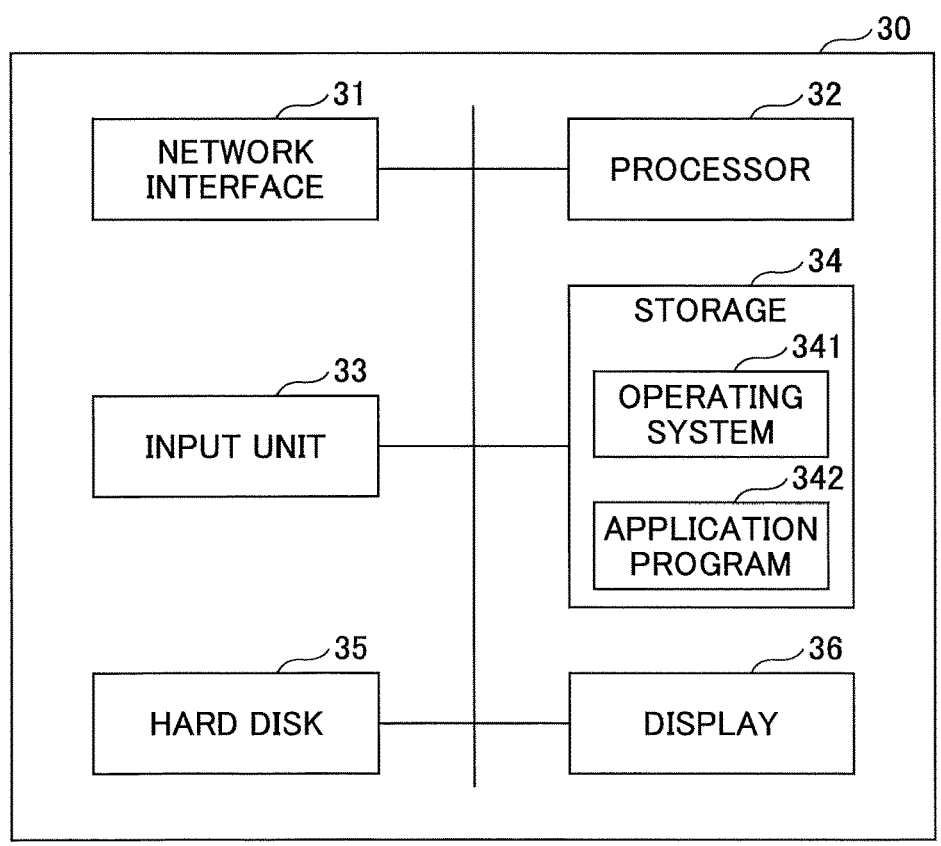
FIG. 9 is a block diagram of an electronic apparatus according to a third embodiment of the present disclosure.

FIG. 9 is a block diagram of an electronic apparatus 30 according to this embodiment.

As presented in FIG. 9, the electronic apparatus 30 may contain a network interface 31, a processor 32, an input unit 33, a storage 34 including an operating system 341 and an application program 342, a hard disk 35, and a display 36 which are connected by a bus.

The network interface 31 may be used to connect to a network such as the Internet, a local area network (LAN), or the like.

The processor 32 may be used to execute a computer program, for example, an application program 342 stored in the storage 34 so as to fulfill the knowledge graph processing methods according to the embodiments of the present disclosure.

The input unit 33 may be used to let a user input various instructions, which may be a keyboard or a touch panel, for example.

The storage 34 may be used to store requisite programs and data as well as the intermediate results generated when the processor 32 conducts the application program 342. Here it should be noted that the storage 34 may further contain an operating system 341, etc.

The hard disk 35 may be used to store the data downloaded from the Internet, for instance, the web pages related to the entities in a knowledge graph.

The display 36 may be used to display the results acquired when executing the application program 342 by the processor 32.

Fourth Embodiment

In this embodiment, another knowledge graph processing method is provided which is based on the knowledge graph processing method according to the first embodiment.

Figure 10:
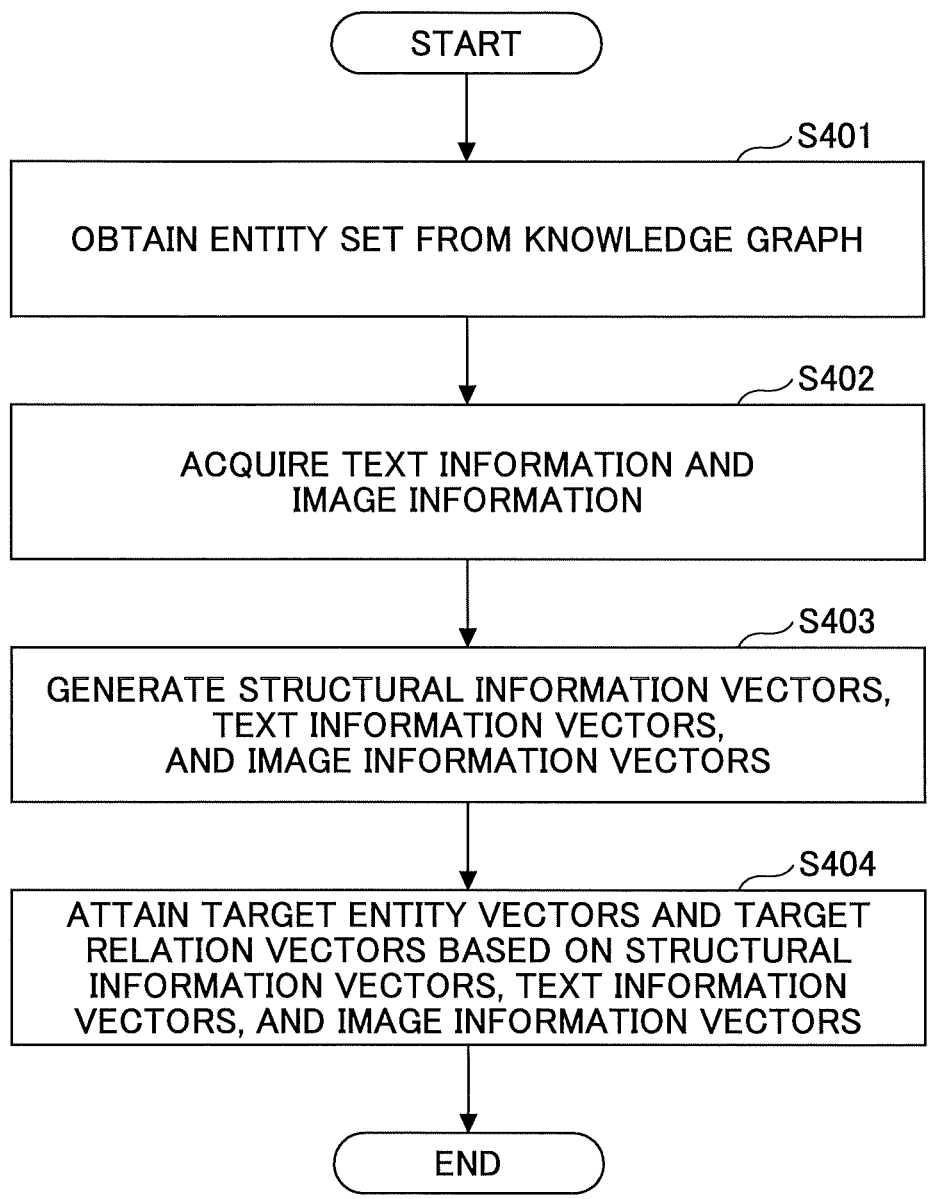
FIG. 10 is a flowchart of another knowledge graph processing method according to a fourth embodiment of the present disclosure.

FIG. 10 is a flowchart of the other knowledge graph processing method according to this embodiment.

As indicated in FIG. 10, in STEP S401, an entity set is obtained from a knowledge graph to be processed.

Figure 11:
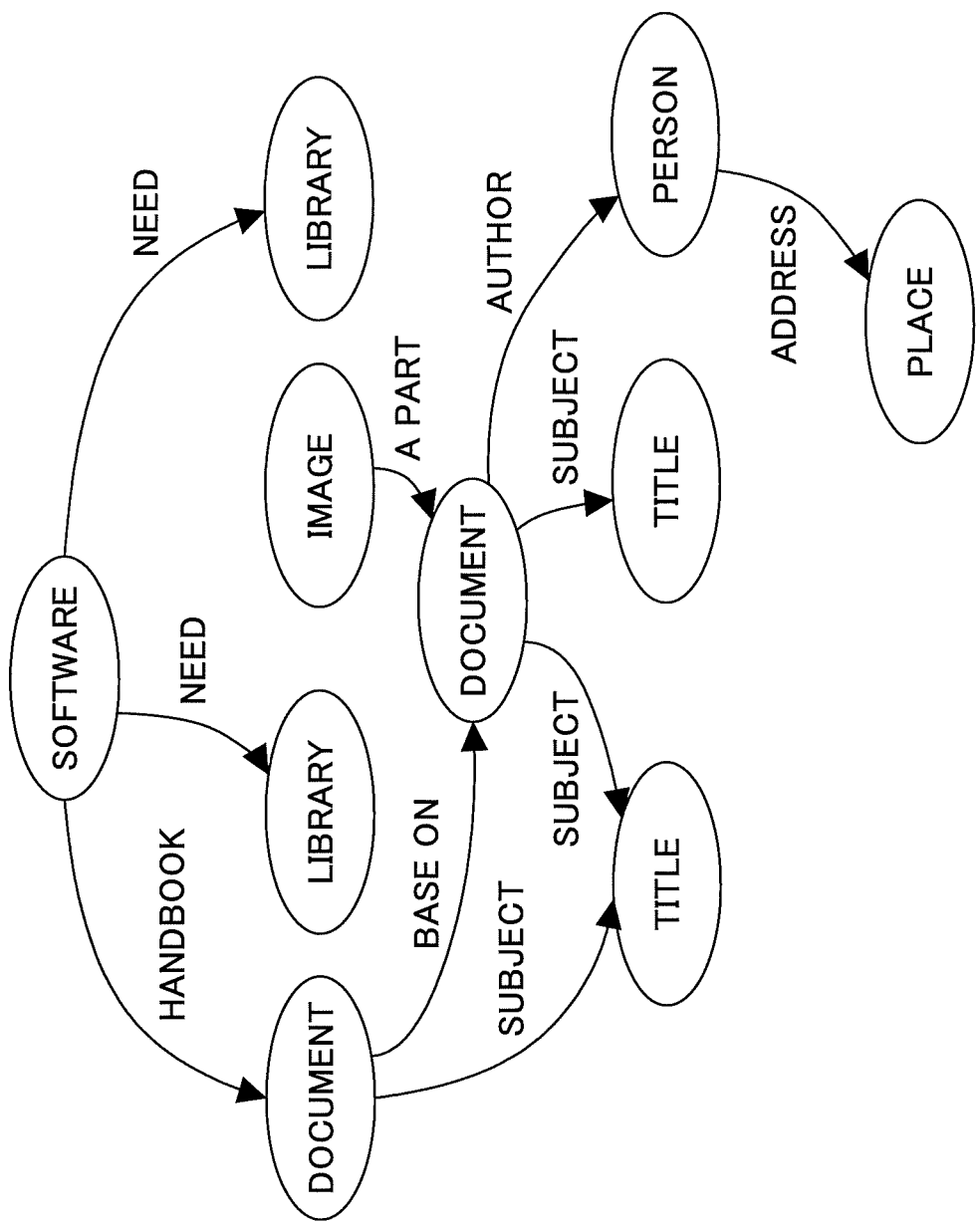
FIG. 11 illustrates an example of a knowledge graph.

FIG. 11 illustrates an example of a knowledge graph.

As show in FIG. 11, the knowledge graph includes entities such as software, a document, a library, a title, a person, a place, and so on. The relation between two entities contains, for example, a handbook, a need, based-on, a subject, an author, a part, or an address. As an illustration, the relation between a head entity (i.e., the first entity in the above-described embodiments) "document" and a tail entity (i.e., the second entity in the above-described embodiments) "person" is "author"; that is, the "author" of the "document" is the "person".

In STEP S402 of FIG. 10, the text information and the image information related to the entities in the entity set are acquired.

For each entity in the entity set, it is possible to attain the text information and the image information relating to the same entity from a database, for example, the Internet. The text information refers to a description about the same entity or other relevant texts. The image information stands for a picture pertaining to the same entity or other relevant images.

An approach is directly gaining the text information and the image information of the same entity from representative web sites by utilizing a web crawler. The representative web sites are those having a large amount of good structural information, for instance, the Wikipedia, the Baidu Baike, and the Sogou Baike.

Another approach is obtaining the text information relating to the same entity from other web sites by conducting entity recognition, and acquiring the image information pertaining to the same entity on the basis of the web page structures. Here, acquiring the image information according to the web page structures means that the relevant texts and image details may be embedded in some typical tag structures (e.g., HTML (Hyper Text Markup Language) tag based structures) when designing web pages, so, by taking advantage of these kinds of characteristics, it is possible to gain the image information from the web pages.

In STEP S403 of FIG. 10, the structural information vectors, the text information vectors, and the image information vectors of the entities in the entity set are generated.

Topological information based vector representations of the entities, i.e., the structural information vectors may be calculated from the known topological structure of the knowledge graph. It is possible to compute them by means of conventional approaches such as TransE, TransR, and so on and so forth.

Figure 12:
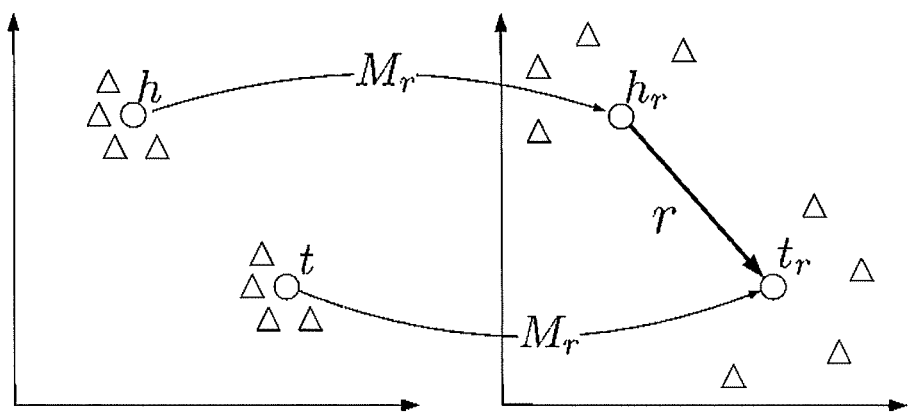
FIG. 12 illustrates a process of mapping the entities and their relations in a knowledge graph into different vector spaces.

FIG. 12 illustrates a process of mapping, by way of the TransR approach, the entities and their relations in a knowledge graph into different vector spaces.

As shown in FIG. 12, the entities and their relations in the knowledge graph (including head entities, relations, and tail entities) may be mapped into different vector spaces by means of the TransR approach.

In particular, for each relation r, there is a mapping matrix $M_r$ by which the corresponding entities h and t (i.e., a head entity and a tail entity) may be mapped into a relation vector space. Here, $h_r = hM_r$, and $t_r = tM_r$.

Because the target function of a triple (h, r, t) is $f_r(h,t) = \|h_r + r - t_r\|_2^2$, the target function of the whole knowledge graph is as follows.

$$L = \sum_{(h,r,t) \in S} \sum_{(h',r',t') \in S'} \max(0, f_r(h,t) + \gamma - f_r(h',t'))$$

Here, max(x,y) refers to taking a larger one from x and y; γ is indicative of an edge coefficient; S is a set of triples existing in the knowledge graph; and S' stands for a set of triples not existing in the knowledge graph, which may be attained by replacing the entities in the set of triples existing in the knowledge graph. By utilizing stochastic gradient descent so as to minimize the target function of the whole knowledge graph L, it is possible to acquire final vector representations, i.e., the structural information vectors of the entities.

For each entity, a plurality of pieces of text information related to the same entity may be obtained. For each piece of text information, it is possible to calculate a text information vector by directly employing a conventional technology such as de-noising auto-encoder or the like, so as to gain the vector representation of the same piece of text information. Next, on the grounds of the weight of each text information vector, aggregation is conducted with respect to all the text information vectors, so that a final text information vector may be attained to serve as the text information vector of the same entity. Here, the weight of each text information vector Wt may be computed by Wt=CoT/SumT in which CoT refers to the authority coefficient of the web site from where the corresponding piece of text information comes, and SumT stands for the sum of the authority coefficients of the web sites from where all the pieces of text information come. The authority coefficients of web sites may be determined artificially, or may be acquired by way of a conventional technology, for example, an Attention mechanism based model.

Also, for each entity, a plurality of pieces of image information relating to the same entity may be gained. For each piece of image information, it is possible to directly use a conventional technology such as a stacked convolutional de-noising auto-encoder or the like, so as to attain the vector representation of the same piece of the image information. Next, on the basis of the weight of each image information vector, aggregation is carried out in regard to all the image information vectors, so that a final image information vector may be acquired to serve as the image information vector of the same entity. Here, the weight of each image information vector Wi may be computed by Wi=CoI/SumI in which CoI refers to the authority coefficient of the web site from where the corresponding piece of image information comes, and SumI stands for the sum of the authority coefficients of the web sites from where all the pieces of image information come. The authority coefficients of web sites may be determined artificially, or may be obtained by means of a conventional technology, for example, an Attention mechanism based model.

In STEP S404 of FIG. 10, on the grounds of the structural information vectors, the text information vectors, and the image information vectors of the entities in the entity set, it is possible to procure the target vectors of the entities and the target relation vectors of the relations between the entities.

FIG. 13 illustrates an example of a complex knowledge graph.

First, a complex knowledge graph is built, as presented in FIG. 13. The complex knowledge graph may be acquired by adding two parts based on text information and image information into the existing topological model of a knowledge graph. In light of the existing topological model of the knowledge graph, i.e., "Head Entity+Relation=Tail Entity", the vector representations of the entities in the complex knowledge graph are based on the combination of three parts, i.e., the topological information, the text information, and the image information. In the model of this kind of complex knowledge graph, the errors generated may be back-propagated to the generation model of the three parts.

By making use of the structural information vectors, the text information vectors, and the image information vectors of the entities, it is possible to establish a joint loss function which may be optimized. The joint loss function contains the structural information coming from the relevant knowledge graph as well as the constraints of the text information and the image information of the entities. Final vector representations of the entities and their relations in the relevant knowledge graph may be acquired by optimizing the joint loss function. The joint loss function may be expressed as the follows.

$$L = \sum_{(h,r,t)} \sum_{(h',r',t')} d(h+r,t) - d(h'+r',t')$$

Here, h is a head entity; t is a tail entity; r is the relation between the head entity and the tail entity; (h,r,t) refers a triple existing in the knowledge graph; and (h',r',t') stands for a triple not existing in the knowledge graph.

In addition, d(h+r,t) may be calculated in the following manner.

$d(h+r,t)=0;$ for i in [Structural Information Vectors, Image Information Vectors, Text Information Vectors]:
    for j in [Structural Information Vectors, Image Information Vectors, Text Information Vectors]:

$d(h+r,t)=d(h+r,t)+\|h_i+r-t_j\|.$

When the joint loss function is optimized, it is possible to output the target vector of the head entity, the target vector of the tail entity, and the target relation vector of the relation information between the head entity and the tail entity.

Therefore, it is clear that that this embodiment is not limited to computing the vector representations of the entities and their relations from the known topological structure of a knowledge graph. It is also possible to obtain the text information and the image information related to the entities from a database (e.g., the Internet), and produce text information vectors and image information vectors on the basis of the text information and the image information relating to the entities, so as to generate final vector representations of the entities and their relations on the grounds of the structural information vectors obtained by using the known structural information of the knowledge graph as well as the text information vectors and the image information vectors pertaining to the entities. In this way, by making use of much more information about the entities in the knowledge graph to create the vector representations of the entities and their relations, it is possible to provide more accurate and comprehensive vector representations of the entities and their relations.

Here it should be noted that the embodiments of the present disclosure may be implemented in any convenient form, for example, using dedicated hardware or a mixture of dedicated hardware and software. The embodiments of the present disclosure may be implemented as computer software implemented by one or more networked processing apparatuses. The network may comprise any conventional terrestrial or wireless communications network, such as the Internet. The processing apparatuses may comprise any suitably programmed apparatuses such as a general-purpose computer, a personal digital assistant, a mobile telephone (such as a WAP or 3G-compliant phone) and so on. Since the embodiments of the present disclosure can be implemented as software, each and every aspect of the present disclosure thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present disclosure is described with reference to the specific embodiments chosen for purpose of illustration, it should be apparent that the present disclosure is not limited to these embodiments, but numerous modifications could be made thereto by those skilled in the art without departing from the basic concept and technical scope of the present disclosure.

The present application is based on and claims the benefit of priority of Chinese Patent Application No. 201710392166.6 filed on May 27, 2017, the entire contents of which are hereby incorporated by reference.

What is claimed is:

1. A knowledge graph processing method comprising:
obtaining an entity set from a knowledge graph waiting for processing, the entity set containing a first entity, a second entity, and relation information between the first entity and the second entity;
acquiring text information and image information related to the first entity and the second entity from a database;
generating a first structural information vector of the first entity and a second structural information vector of the second entity based on structural information of the knowledge graph, and creating a first text information vector of the first entity, a first image information vector of the first entity, a second text information vector of the second entity, and a second image information vector of the second entity based on the text information and the image information acquired; and
building a joint loss function based on the first structural information vector, the first text information vector, the first image information vector, the second structural information vector, the second text information vector, and the second image information vector, and carrying out optimization with respect to the joint loss function so as to attain a first target vector of the first entity, a second target vector of the second entity, and a target relation vector of the relation information between the first entity and the second entity when the joint loss function is optimized, wherein, the acquiring text information and image information related to the first entity and the second entity from a database includes
directly downloading the text information and the image information related to the first entity and the second entity from the Internet by means of a web crawler; and
procuring web pages pertaining to the first entity and the second entity from the Internet, recognizing the text information related to the first entity and the second entity from texts in the web pages by way of entity recognition, and gaining the image information related to the first entity and the second entity by analyzing structures of the web pages, and
wherein the first text information vectors and the second text information vectors are obtained by a de-noising auto-encoder to perform calculation on the text information of the first entity and the second entity, and
the first image information vectors and the second image information vectors are obtained by a stacked convolutional de-noising auto-encoder to conduct calculation with respect to the image information of the first entity and the second entity,
wherein, the creating a first text information vector of the first entity and a second text information vector of the second entity based on the acquired text information includes
for each piece of text information related to the first entity, calculating a text information vector of the corresponding piece of text information;
aggregating, based on a weight of each of the text information vectors related to the first entity, the text information vectors related to the first entity, so as to obtain the first text information vector of the first entity;
for each piece of text information related to the second entity, computing a text information vector of the corresponding piece of text information; and
aggregating, based on a weight of each of the text information vectors related to the second entity, the text information vectors related to the second entity, so as to acquire the second text information vector of the second entity, and
wherein the weight of each text information vector Wt is computed by Wt=CoT/SumT, wherein the CoT is an authority coefficient of the web pages from where corresponding piece of text information comes, and SumT is a sum of the authority coefficients of the web pages from where all pieces of text information come.

2. A non-transitory computer-readable medium having computer-executable instructions for execution by a processing system, wherein, the computer-executable instructions, when executed, cause the processing system to carry out the knowledge graph processing method according to claim 1.

3. A knowledge graph processing method comprising:
obtaining an entity set from a knowledge graph waiting for processing, the entity set containing a first entity, a second entity, and relation information between the first entity and the second entity;
acquiring text information and image information related to the first entity and the second entity from a database;
generating a first structural information vector of the first entity and a second structural information vector of the second entity based on structural information of the knowledge graph, and creating a first text information vector of the first entity, a first image information vector of the first entity, a second text information vector of the second entity, and a second image information vector of the second entity based on the text information and the image information acquired; and
building a joint loss function based on the first structural information vector, the first text information vector, the first image information vector, the second structural information vector, the second text information vector, and the second image information vector, and carrying out optimization with respect to the joint loss function so as to attain a first target vector of the first entity, a second target vector of the second entity, and a target relation vector of the relation information between the first entity and the second entity when the joint loss function is optimized,
wherein, the acquiring text information and image information related to the first entity and the second entity from a database includes
directly downloading the text information and the image information related to the first entity and the second entity from the Internet by means of a web crawler; and
procuring web pages pertaining to the first entity and the second entity from the Internet, recognizing the text information related to the first entity and the second entity from texts in the web pages by way of entity recognition, and gaining the image information related to the first entity and the second entity by analyzing structures of the web pages, and
wherein the first text information vectors and the second text information vectors are obtained by a de-noising auto-encoder to perform calculation on the text information of the first entity and the second entity, and
the first image information vectors and the second image information vectors are obtained by a stacked convolutional de-noising auto-encoder to conduct calculation with respect to the image information of the first entity and the second entity, wherein, the creating a first image information vector of the first entity and a second image information vector of the second entity based on the acquired image information includes
for each piece of image information related to the first entity, calculating an image information vector of the corresponding piece of image information;
aggregating, based on a weight of each of the image information vectors related to the first entity, the image information vectors related to the first entity, so as to obtain the first image information vector of the first entity;
for each piece of image information related to the second entity, computing an image information vector of the corresponding piece of image information; and
aggregating, based on a weight of each of the image information vectors related to the second entity, the image information vectors related to the second entity, so as to acquire the second image information vector of the second entity,
wherein the weight of each image information vector Wi is computed by Wi=CoI/SumI, wherein the CoI is an authority coefficient of the web pages from where a corresponding piece of image information comes, and SumI is a sum of the authority coefficients of the web pages from where all pieces of image information come.

4. A knowledge graph processing device comprising:
a processor that is configured to:
obtain an entity set from a knowledge graph waiting for processing, the entity set containing a first entity, a second entity, and relation information between the first entity and the second entity;

acquire text information and image information related to the first entity and the second entity from a database;

generate a first structural information vector of the first entity and a second structural information vector of the second entity based on structural information of the knowledge graph, and create a first text information vector of the first entity, a first image information vector of the first entity, a second text information vector of the second entity, and a second image information vector of the second entity based on the text information and the image information acquired; and build a joint loss function based on the first structural information vector, the first text information vector, the first image information vector, the second structural information vector, the second text information vector, and the second image information vector, and carry out optimization with respect to the joint loss function so as to attain a first target vector of the first entity, a second target vector of the second entity, and a target relation vector of the relation information between the first entity and the second entity when the joint loss function is optimized, and wherein the processor is further configured to:

directly download the text information and the image information related to the first entity and the second entity from the Internet by means of a web crawler; and procure web pages pertaining to the first entity and the second entity from the Internet, recognize the text information related to the first entity and the second entity from texts in the web pages by way of entity recognition, and gain the image information related to the first entity and the second entity by analyzing structures of the web pages, and wherein the first text information vectors and the second text information vectors are obtained by a de-noising auto-encoder to perform calculation on the text information of the first entity and the second entity, and the first image information vectors and the second image information vectors are obtained by a stacked convolutional de-noising auto-encoder to conduct calculation with respect to the image information of the first entity and the second entity, wherein, the processor is further configured to:

for each piece of text information related to the first entity, calculate a text information vector of the corresponding piece of text information;

aggregate, based on a weight of each of the text information vectors related to the first entity, the text information vectors related to the first entity, so as to obtain the first text information vector of the first entity;

for each piece of text information related to the second entity, compute a text information vector of the corresponding piece of text information; and aggregate, based on a weight of each of the text information vectors related to the second entity, the text information vectors related to the second entity, so as to acquire the second text information vector of the second entity, and wherein the weight of each text information vector $W_t$ is computed by $W_t = CoT/SumT$, wherein the CoT is an authority coefficient of the web pages from where corresponding piece of text information comes, and SumT is a sum of the authority coefficients of the web pages from where all pieces of text information come.

5. The knowledge graph processing device according to claim 4, wherein, the processor is further configured to:

for each piece of image information related to the first entity, calculate an image information vector of the corresponding piece of image information;

aggregate, based on a weight of each of the image information vectors related to the first entity, the image information vectors related to the first entity, so as to obtain the first image information vector of the first entity;

for each piece of image information related to the second entity, compute an image information vector of the corresponding piece of image information; and aggregate, based on a weight of each of the image information vectors related to the second entity, the image information vectors related to the second entity, so as to acquire the second image information vector of the second entity.

* * * * *